R. C. SHARP.
EXPANSIBLE PACKING HEAD.
APPLICATION FILED NOV. 26, 1921.

1,427,648.

Patented Aug. 29, 1922.

INVENTOR
RAY C. SHARP
BY Hazard & Miller
ATT'YS.

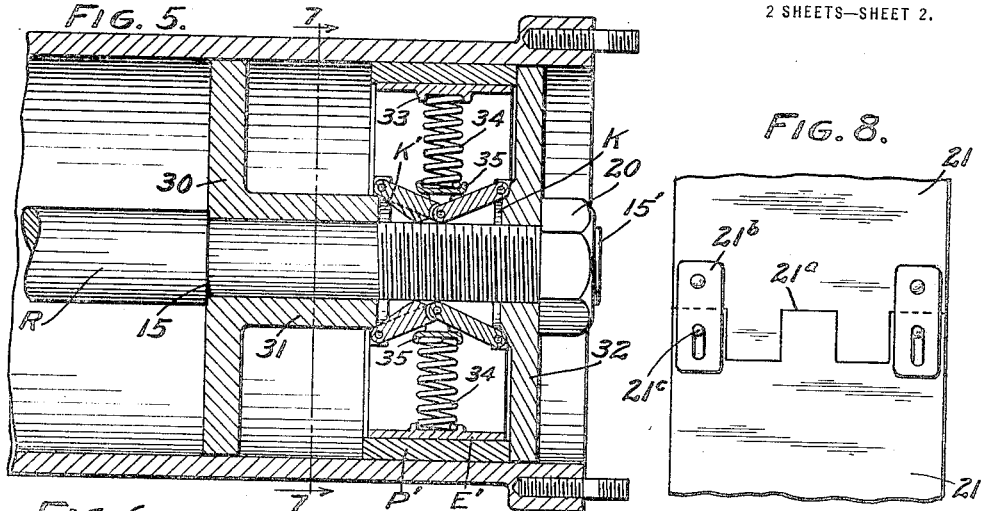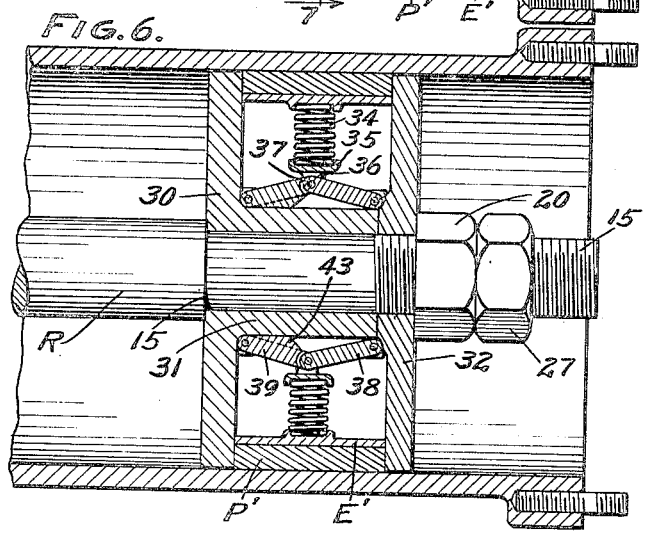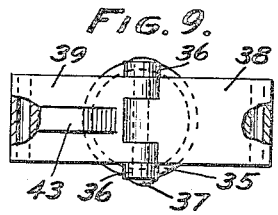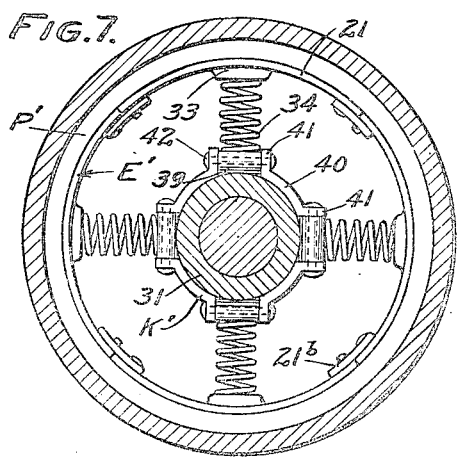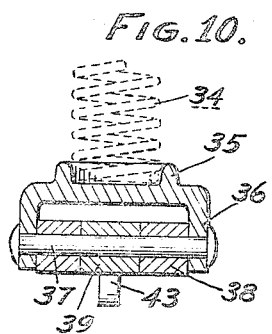

UNITED STATES PATENT OFFICE.

RAY C. SHARP, OF LOS ANGELES, CALIFORNIA.

EXPANSIBLE PACKING HEAD.

1,427,648.  Specification of Letters Patent.  Patented Aug. 29, 1922.

Application filed November 26, 1921. Serial No. 517,939.

*To all whom it may concern:*

Be it known that I, RAY C. SHARP, a citizen of the United States, residing at Los Angeles, in the county of Los Angeles and State of California, have invented new and useful Improvements in Expansible Packing Heads, of which the following is a specification.

My invention relates to expansible packing heads for pistons, and a purpose of my invention is the provision of a packing head of extremely simple and efficient construction and which is at all times operable to automatically expand the packing to provide a fluid tight seal for the piston.

I will describe two forms of packing heads embodying my invention, and will then point out the novel features thereof in claims.

Fig. 5 is a view similar to Fig. 1 showing another form of packing head embodying my invention.

Fig. 6 is a view similar to Fig. 5 showing the packing head in the active position.

Fig. 7 is a transverse sectional view taken on the line 7—7 of Fig. 5.

Fig. 8 is a fragmentary detail view showing the means for connecting the section of the expanding rim shown in Figs. 5 and 6.

Fig. 9 is an enlarged detail view of one pair of links comprised in the packing head shown in Figs. 5 and 6.

Fig. 10 is an enlarged fragmentary sectional view of one of the spring supporting sockets embodied in the packing head shown in Figs. 5 and 6.

Similar reference characters refer to similar parts in each of the several views.

Figure 1:
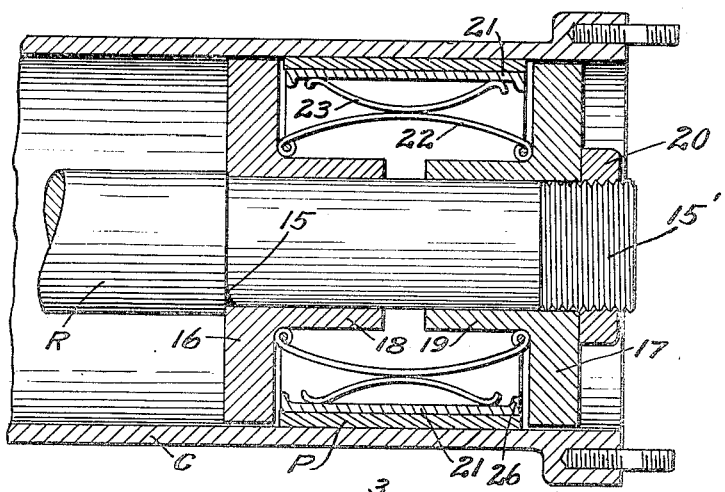
Figure 1 is a longitudinal sectional view of a cylinder having applied thereto one form of packing head embodying my invention, and with the latter in nonexpanded or inactive position.

Referring specifically to the drawings, my invention, in its first embodiment, comprises a piston rod R, one end of which is of reduced diameter to provide a shoulder 15 at a point spaced from the threaded end 15' thereof. Mounted on this reduced portion of the piston rod are a pair of discs 16 and 17 having formed integrally therewith sleeves 18 and 19, respectively, so situated as to be between the discs when in applied position upon the rod. As shown in Fig. 1, the disc 16 is adapted to abut the shoulders 15, and the disc 17 is adapted to be adjusted upon the rod by means of a nut 20 engaging the threaded portion 15'.

Figure 4:
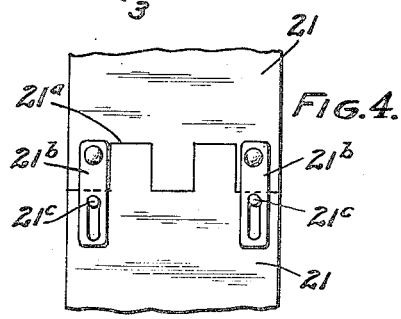
Fig. 4 is an enlarged detail showing the connection between the sections of the expanding rim.

A packing ring P is arranged between the discs 16 and 17 and is adapted to be automatically expanded so as to snugly fit the walls of a cylinder C by a plurality of arcuate shaped shoes 21 constituting an expanding rim E, and each of which is engaged by a pair of springs 22 and 23. As shown in Fig. 4, the confronting ends of any two adjacent sections are rabetted as indicated at 21$^a$, and one end carries straps 21$^b$ which are slotted to receive pins 21$^c$ for providing an extensible connection between the sections to allow of the necessary expansion of the rim, as will be understood.

Figure 2:
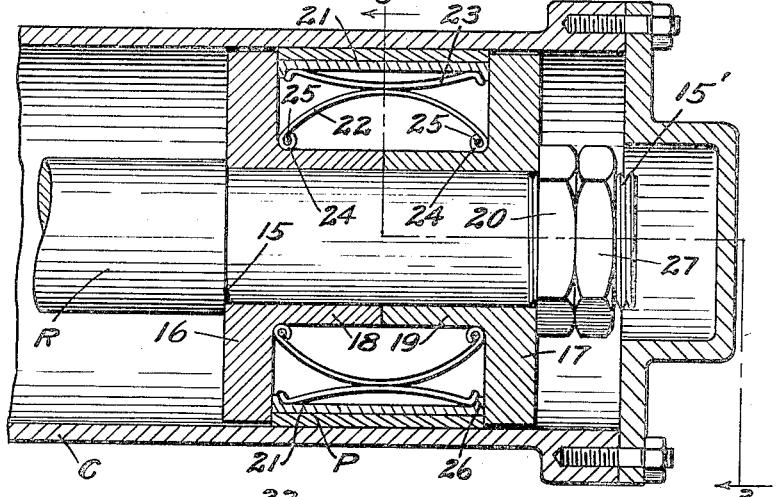
Fig. 2 is a view similar to Fig. 1 with the packing in expanded or active position.
Figure 3:
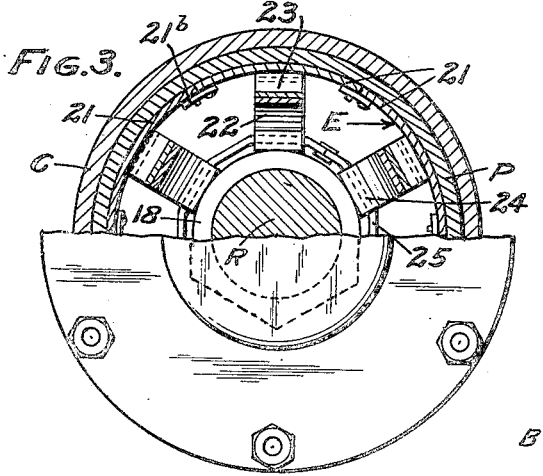
Fig. 3 is a transverse sectional view taken on the line 3—3 of Fig. 2.

The springs 22 are of semielliptical form with their ends bent upon themselves to provide eyes 24 for the reception of securing wires 25. The wires 25 are so associated with the springs 22 as to secure the ends of the springs against the sleeves 18 and 19, thereby insuring of the proper functioning of the springs when the disc 17 is in active position as shown in Fig. 2. The springs 23 are also of elliptical form, but of a curvature less than that of the springs 22. These springs 23 are adapted to bear directly against the sections 21 of the expanding ring with the latter provided with flange edges 26 against which the flared ends of the springs are adapted to bear. The arrangement of these springs with relation to the springs 22, is such that the pinnacle or apex of the springs contact with each other, with each pair of springs functioning to expand the corresponding section 21 radially to effect a similar expansion of the packing ring.

In operation, the parts comprising the packing head are assembled in the manner shown in Fig. 1, and upon the manipulation of the nut 20 to effect an inward feeding of the disc 17, the several springs 23 are caused to be compressed to effect a radial expansion of their medial points or those points bearing upon the springs 23. The springs 23 in turn are moved radially to effect expansion of the ring 21 thereby causing the necessary expansion of the packing ring P. With the disc 17 in its final position as shown in Fig. 2, a nut lock 27 is applied to the threaded end 15' of the rod R, thereby effecting a locking of the nut 20 so as to maintain the disc in this active position. It will be understood that as the packing ring P wears, the springs 22 and 23 will automatically function to further expand the ring 21 and to thereby take up such wear as to maintain a snug fit between the ring and the wall of the cylinder.

Referring to Figs. 5 to 10 inclusive, I have here shown another embodiment of my invention in which a disc 30 is applied to the reduced end of the rod R so as to abut the shoulder 15, and this disc is provided with a sleeve 31 similar to the sleeve 18. A second disc 32 is mounted on the threaded end of the rod and is adapted to be moved inwardly from the position shown in Fig. 5 to that shown in Fig. 6 by means of the nut 20.

Arranged between the discs is a packing ring P' and an expanding rim E', the latter being constructed in the same manner as the expanding ring E in the first form of my invention with the exception that the inner side of each section 21 is formed with annular flanges 33 constituting seats for the outer ends of coil expansible springs 34. The inner ends of the springs 34 are seated in cups 35 with each cup formed with ears 36 that receive a pin 37 for pivotally connecting the confronting ends of a pair of links 38 and 39 constituting a toggle. The outer ends of the links 38 and 39 are pivotally sustained on collars K and K', respectively, each of which as clearly shown in Fig. 7 is made up of a plurality of sections 40 formed at their ends with ears 41 receiving pins 42. The pins 42 extend through the ends of the links 38 and 39, and thereby pivotally sustain the links so that the two will properly co-operate in effecting a compression of the springs 35.

As shown in Figs. 6, 9 and 10, each link 39 is formed on its inner side with a cam 43 that is adapted to engage the sleeve 31 for effecting a radial movement of the inner ends of the links.

In assembling, the links normally occupy the position shown in Fig. 5 with the springs 35 fully expanded and the cams 43 disengaged from the sleeve 31. Upon inward feeding of the disc 32, the cams 43 are caused to engage the sleeve 31 thereby moving the inner ends of the links 38 and 39 radially of the rod R, or to the position shown in Fig. 6. This obviously effects a compression of the springs 35 so that in the final adjustment of the disc 32, the springs are functioned to expand the rim E' and consequently the packing ring P'.

Although I have herein shown and described only two forms of packing heads each embodying my invention, it is to be understood that various changes and modifications may be made herein without departing from the spirit of the invention and the spirit and scope of the appended claims.

What I claim is:

1. A piston head comprising a pair of discs, an expansible packing ring between the discs, two annular series of leaf springs arranged between the discs, with the springs of one series arranged in contacting relation with the springs of the other series, and one of said discs being movable to effect an expansion of one set of springs to cause a radial expansion of the packing ring through the medium of the other set of springs.

2. A piston head comprising spaced discs, an annular series of semielliptical springs between the discs, an expansible packing ring between the discs, an expanding rim within the ring and between the discs, and a second series of semielliptical springs engageable with the expanding rim and with the springs of the first series, the springs of one set being arranged in reverse relation to the springs of the other set whereby upon adjustment of one disc toward the other an expansion of the springs of both sets is effected to cause expansion of said packing ring.

3. A piston head comprising a pair of discs, an expanding rim between the discs including sections expansibly associated with each other, an annular series of semi-elliptical springs arranged between the discs, wires for securing the springs in circular formation, a second set of semielliptical springs reversely arranged with respect to the springs of the first set and interposed between the latter and said rim, flanges on said rim for preventing displacement of the second set of said springs, and an expansible packing ring embracing said rim.

4. A packing head comprising a pair of discs, a sleeve carried by one of the discs, collars between the discs with one collar embracing said sleeve, links pivotally connected to the collars and to each other, a sectional expanding rim between the discs, an expansible packing ring embracing the rim, expansible springs interposed between the sections of the ring and the connected ends of said links, and cams formed on certain of the links whereby upon adjustment of one disc in the direction of the other said cams engage said sleeve to cause said links to compress said springs to effect an expansion of said rim.

In testimony whereof I have signed my name to this specification.

RAY C. SHARP.